United States Patent [19]

Santimauro

[11] 4,432,796

[45] Feb. 21, 1984

[54] PROCESS FOR THE CONDITIONING OF AN ORGANIC PIGMENT

[75] Inventor: John F. Santimauro, Wyckoff, N.J.

[73] Assignee: Mobay Chemical Corporation, Pittsburgh, Pa.

[21] Appl. No.: 469,021

[22] Filed: Mar. 1, 1983

Related U.S. Application Data

[63] Continuation of Ser. No. 304,127, Sep. 21, 1981, abandoned.

[51] Int. Cl.$^3$ .......................... C08K 5/20; C08K 5/56; C09D 11/00
[52] U.S. Cl. ................................... 106/19; 106/288 Q
[58] Field of Search ............................ 106/288 Q, 19

[56] References Cited

U.S. PATENT DOCUMENTS

| | | | |
|---|---|---|---|
| 2,821,530 | 1/1958 | Strove | 106/288 Q |
| 2,840,568 | 6/1958 | Bouillard et al. | 106/288 Q |
| 3,265,699 | 8/1966 | Jaffe | 246/49 |
| 3,697,526 | 10/1972 | Pugin | 106/288 Q |
| 3,836,379 | 9/1974 | Kirsch et al. | 106/288 Q |
| 4,212,975 | 7/1980 | Kruit | 106/288 Q |
| 4,226,634 | 10/1980 | Dimruth | 106/288 Q |

FOREIGN PATENT DOCUMENTS

| | | |
|---|---|---|
| 450361 | 4/1943 | Belgium . |
| 1275028 | 8/1968 | Fed. Rep. of Germany . |
| 2851752 | 6/1980 | Fed. Rep. of Germany . |
| 2072512 | 9/1971 | France . |
| 2154787 | 5/1973 | France . |
| 312143 | 2/1956 | Switzerland . |

OTHER PUBLICATIONS

Chem. Abst. 93:169, 748f, Sappok et al., Jun. 12, 1980.

Primary Examiner—Theodore Morris
Attorney, Agent, or Firm—Sprung, Horn, Kramer & Woods

[57] ABSTRACT

A process has been developed for the conditioning of certain classes of organic pigments by treatment of polyphosphoric acids.

9 Claims, No Drawings

PROCESS FOR THE CONDITIONING OF AN ORGANIC PIGMENT

This application is a continuation of application Ser. No. 304,127, filed Sept. 21, 1981, now abandoned.

This invention relates to a process for the conditioning of an organic pigment by treatment with polyphosphoric acid.

BACKGROUND OF THE INVENTION

It is known to use polyphosphoric acid to ring-close diaryloterephthalic acids and to condition 2,9-difluoroquinacridone and perylene (hydrazine) pigment and in connection with these prior art teachings, attention is directed to DOS No. 23 05 266, U.S. Pat. No. 28 21 530; DOS No. 21 48 866; DOS No. 20 58 577 and French No. 720207. However, conditioning with polyphosphoric acid is not known for the several classes of pigments enumerated below.

DESCRIPTION OF THE INVENTION

More particularly, this invention deals with an improved process for the conditioning of a pigment of the anthanthrone, pyranthrone, iso-violanthrone, flavanthrone, indanthrone, naphthaldazine, indigo, thioindigo, naphthalene tetracarboxylic acid, dioxazine, isoindolinone, perylene tetracarboxylic acid and bisimide, anthrapyrimidine, acylamino anthraquinone, dianthraquinonyl, azo anthraquinone, azomethine anthraquinone and phthalocyanine series, which comprises treating the crude pigment with polyphosphoric acid and drowning the mixture in such an amount of water, ice and/or a water-miscible organic liquid that the $H_3PO_4$ equivalent of the resulting mixture is below 40%.

The process of the present invention is especially suitable for the conditioning of a pigment of the perylene teracarboxylic acid bisimide, optionally chlorinated and/or brominated copper phthalocyanine, dioxazine, flavanthrone or indanthrone series.

Individual examples of pigments which can be conditioned according to the present invention are:
- Pigment Red 123 (Colour Index Constitution No. 71145);
- Pigment Red 149 (C.I. 71137);
- Pigment Red 179 (C.I. 71130);
- Pigment Violet 23 (C.I. 51319);
- Pigment Yellow 112 (C.I. 70600);
- Pigment Blue 60 (C.I. 69800);
- Pigment Blue 15, α-modification (C.I. 74160);
- Pigment Blue 15, β-modification (C.I. 74160);
- Copper Phthalocyanine Blue with a chlorine content of 3 to 14%, preferably about 3 to 6%;
- Pigment Green 7 (C.I. 74260).

The crude pigments are conditioned after they have been prepared by any of the well known processes of making the crude pigment.

The Polyphosphoric acids employed as conditioning agents in the present invention are known viscous liquid compositions which are essentially mixtures of a plurality of oxygen agents of pentavalent phosphorus the principal components of which are condensation polymers of orthophosphoric acid, particularly linear polymers defined by the structural formula

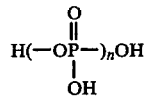

wherein n is an integer at least equal to 2.

Each of the component acids may be regarded as a chemical combination of water and $P_2O_5$ in a characteristic stoichometric ratio; and the composition of the polyphosphoric acids may be similarly defined in terms of the weight percent of $P_2O_5$ equivalent to said mixture, based on total phosphorus content of said mixture determined by analysis (termed the "$P_2O_5$ equivalent"), or in terms of the related weight percent of $H_3PO_4$ equivalent to said mixture (termed the "$H_3PO_4$ equivalent"). The term "$H_3PH_4$ equivalent" is used in the following.

The polyphosphoric acid used should preferably have a $H_3PO_4$ equivalent of at least 100%; particularly advantageously the polyphosphoric acid strength is between 105 and 125% $H_3PO_4$ equivalent. In another preferred practice of the present invention commercial polyphosphoric acids having $H_3PO_4$ equivalents of 113% to 118% are employed as conditioning agents.

The amount of polyphosphoric acid used is preferably 2–20 parts by weight and particularly advantageously 3–8 parts by weight, based on 1 part by weight of the 100% pigment. The polyphosphoric acid pasting is generally carried out at 20°–200° C., preferably at 40°–150° C. The time of acid pasting is preferably 1 hour to 20 hours.

The acid pasting can be accomplished by solution or by slurrying of the crude pigment in polyphosphoric acid.

After the acid treatment the charge is optionally cooled to below 100° C. and drowned in such an amount of water, ice, a water-miscible organic liquid or a mixture of these substances that the $H_3PO_4$ equivalent of the resulting mixture is below 40%. The amount of the drowning varies depending on the concentration of the polyphosphoric acid used. Generally, 1–20 parts by weight, preferably 2–5 parts by weight, based on 1 part by weight of the acid/pigment mixture of water, ice, a water-miscible organic liquid or a mixture of these substances is used as the drowning material.

Examples of suitable water-miscible organic liquids are methanol, ethanol, isopropanol, glycerol, ethyleneglycol, diacetone alcohol and acetone, methanol being preferred.

The conditioned pigment is isolated by usual methods, e.g. by filtration.

Of course, the quality of the conditioned pigment obtained according to the invention can be further improved by treatment in water, organic solvents or mixtures, at room or elevated temperatures, with or without surfactants. Resinations can also be applied.

The pigment conditioned according to the process of this invention, surprisingly have an improved masstone and greater color strength when compared to products conditioned according to conventional methods.

Compared to the acid pasting with sulfuric acid the present process offers several important and surprising advantages: Polyphosphoric acid can be used at higher temperatures than sulfuric acid, and, therefore, at lower amounts; in neutralization units, phosphoric acid consumes less alkali than sulfuric acid (assuming neutralization to pH 5-6); phosphoric acid can be recovered from the mother liquor and can be upgraded for further use.

The invention is illustrated by the following specific examples, but it is to be understood that it is not limited to the details thereof and that changes may be made without departing from the scope of the invention. The parts given are by weight.

EXAMPLE 1

1 part of crude Pigment Red 149 is added at 90°–100° C. to 7 parts polyphosphoric acid (of 117% $H_3PO_4$ equivalent). The mixture is stirred at 105°–110° C. for 15–20 hours and drowned in water at 20°–30° C. and stirred 2 hours. The pigment is isolated by filtration.

EXAMPLE 2

1 part of crude Pigment Red 179 is added at 80°–95° C. to 10 parts polyphosphoric acid (of 117.1% $H_3PO_4$ equivalent) and stirred for 15 hours at 104°–106° C. The melt is drowned in 30 parts water at 20°–30° C. and stirred for 2 hours. The pigment is isolated by filtration.

EXAMPLE 3

1 part of crude Pigment Green 7 is added at 80°–90° C. to 7 parts polyphosphoric acid) of 117.1% $H_3PO_4$ equivalent). The temperature is raised over 16 hours to 195° C. and the mixture is stirred for additional 2 hours before drowning onto 30 parts water at 20°–30° C. The aqueous slurry is stirred for 2 hours. Thereafter, the pigment is isolated by filtration.

EXAMPLE 4

1 part of crude Pigment Blue 15 α- or β-modification is added at 90°–100° C. to 5 parts polyphosphoric acid (of 117.1% $H_3PO_4$ equivalent) and the mixture is stirred for about 15 hours at 105°–108° C. The charge is drowned in 20 parts water at 20°–30° C. and the resulting slurry is stirred for 2 hours. The blue pigment is isolated by filtration.

EXAMPLE 5

Example 4 is repeated except that the crude Pigment Blue 15 is replaced by Copper Phthalocyanine Blue with a chlorine content of about 3–6%.

EXAMPLE 6

1 part of crude Pigment Red 123 is added at 80°–95° C. to 5 parts polyphosphoric acid (of 116% $H_3PO_4$) equivalent). The melt is stirred for about 15 hours at 95°–110° C. Thereafter, the temperature is raised to 100°–105° C. and stirring is continued for 1 hour at this temperature. The melt is drowned onto 18 parts water 20°–30° C. and the aqueous slurry is stirred for 2 hours. The pigment is isolated by filtration.

EXAMPLE 7

1 part of crude Pigment Violet 23 is added at 90°–100° C. to 5 parts polyphosphoric acid (of 110% $H_3PO_4$ equivalent). The melt is stirred for about 15 hours at 100°–105° C. and drowned onto 10 parts water at 20°–30° C. and the resulting slurry is stirred for 2 hours. The violet pigment is isolated by filtration.

EXAMPLE 8

1 part of crude Pigment Yellow 112 is added at 70°–80° C. to 7 parts polyphosphoric acid (of 117.1% $H_3PO_4$ equivalent). The mixture is heated to 105° C. and held at 103°–107° C. for about 15 hours. The acid melt is then drowned in 33 parts water at 20°–30° C. and stirred 2 hours at 20°–30° C. The yellow pigment is isolated by filtration.

EXAMPLE 9

1 part of crude Pigment Blue 60 is added at 70°–80° C. to 7 parts polyphosphoric acid (of 117.1% $H_3PO_4$ equivalent). The acid melt is heated to 100° C. and stirred for about 15 hours at 100°–105° C. The acid melt is then drowned in 33 parts water at 10°–20° C. The slurry is stirred 2 hours at 10°–20° C., and the blue pigment is isolated by filtration.

EXAMPLE 10

1 part of crude Pigment Violet 23 is added at 90°–100° C. to 6 parts polyphosphoric acid (of 115.9% $H_3PO_4$ equivalent). The acid melt is stirred for 6 hours at 100° C. and then drowned into 2.5 parts of methanol. The slurry is refluxed 1 hour, drowned onto 4 parts of water, stirred ½ hour at 60° C., and the violet pigment is isolated by filtration.

What is claimed is:

1. A process for the conditioning of a crude pigment which comprises treating a crude pigment selected from the group consisting of Pigment Red 123, Pigment Red 190, Pigment Yellow 112, Pigment Blue 15 and Pigment Violet 23 with polyphosphoric acid and drowning the mixture in such an amount of water, ice, a water-miscible organic liquid or a mixture of these substances so that the $H_3PO_4$ equivalent of the resulting mixture is below 40%, the amount of said polyphosphoric acid being 2 to 20 parts by weight based on 1 part by weight of the 100% pigment and wherein the process is conducted at a temperature of between about 20° C. and about 200° C.

2. A process according to claim 1 wherein the crude pigment is Copper Phyhalocyanine Blue with a chlorine content of about 3 to 14%.

3. Process according to claim 1 wherein the crude pigment is Pigment Violet 23.

4. Process according to claim 1 wherein the crude pigment is Pigment Red 123.

5. Process according to claim 1 wherein the crude pigment is Copper Phthalocyanine Blue with a chlorine content of about 3 to 6%.

6. Process according to claim 1 wherein the polyphosphoric acid used has an acid strength of between 105 and 125% $H_3PO_4$ equivalent.

7. Process according to claim 1 wherein the amount of polyphosphoric acid used is 3–8 parts by weight, based on 1 part by weight of the 100% pigment.

8. Process according to claim 1 wherein the mixture is drowned in water.

9. Process according to claim 1 wherein the mixture is drowned in methanol.

* * * * *